US007626960B2

(12) United States Patent
Müller

(10) Patent No.: US 7,626,960 B2

(45) Date of Patent: Dec. 1, 2009

(54) USE OF SIGNALING FOR AUTO-CONFIGURATION OF MODULATORS AND REPEATERS

(75) Inventor: Dominique Müller, Helsinki (FI)

(73) Assignee: Nokia Corporation, Espoo (FI)

( * ) Notice: Subject to any disclaimer, the term of this patent is extended or adjusted under 35 U.S.C. 154(b) by 896 days.

(21) Appl. No.: 10/827,712

(22) Filed: Apr. 20, 2004

(65) Prior Publication Data

US 2005/0232223 A1 Oct. 20, 2005

(51) Int. Cl.
*H04W 4/00* (2009.01)
*H04B 7/14* (2006.01)

(52) U.S. Cl. .......................... 370/328; 455/7; 455/13.1; 455/20; 370/315; 725/62; 725/68; 725/139

(58) Field of Classification Search ............... 455/0–23; 370/315–327; 725/62–72, 127; 375/211; 332/117
See application file for complete search history.

(56) References Cited

U.S. PATENT DOCUMENTS

| | | | | |
|---|---|---|---|---|
| 6,691,311 | B1 * | 2/2004 | Yata et al. | 725/68 |
| 6,697,603 | B1 * | 2/2004 | Lovinggood et al. | 455/13.1 |
| 6,785,903 | B1 * | 8/2004 | Kuh | 725/127 |
| 2001/0005406 | A1 * | 6/2001 | Mege et al. | 375/354 |
| 2002/0025826 | A1 | 2/2002 | Aaltonen | |
| 2002/0080887 | A1 * | 6/2002 | Jeong et al. | 375/295 |
| 2002/0114299 | A1 * | 8/2002 | Lu et al. | 370/336 |
| 2004/0246888 | A1 * | 12/2004 | Peron | 370/208 |
| 2005/0044142 | A1 * | 2/2005 | Garrec et al. | 709/204 |

FOREIGN PATENT DOCUMENTS

| | | | |
|---|---|---|---|
| WO | WO 97/04613 | * | 2/1997 |

OTHER PUBLICATIONS

DVB—SCENE 09, Riding the HD Wave, http://www.dvb.org/documents/newsletters/DVB-SCENE-9.pdf, Mar. 2004.

ITU—DTTB Tutorial—System Overview, 6 System Overview, http://happy.emu.id.au/lab/tut/dttb/dtbtut6a.htm, Apr. 19, 2004.

Nokia Connecting People, Journal and Conference Papers, http://www.nokia.com/nokia/0..49410.0.html?id-149, pp. 1-15, use date Mar. 19, 2004.

(Continued)

*Primary Examiner*—Lester Kincaid
*Assistant Examiner*—Daniel Lai
(74) *Attorney, Agent, or Firm*—Banner & Witcoff, Ltd.

(57) ABSTRACT

The present invention provides methods and apparatuses for configuring a modulator in a digital broadcast system using service information that is also broadcast to wireless terminals. In an embodiment of the invention, the service information is provided by a generator that encapsulates the service information in a transport stream that is received by a cell transmitter. The service information is parsed by each cell transmitter to determine the current modulator parameters. If at least one of the modulation parameters has changed, the associated modulator is reconfigured with the updated modulation parameters. The invention also provides methods and apparatuses for supporting repeaters in the digital broadcast system in order to provide supplementary RF coverage in associated cells. A repeater may retransmit a received radio signal at the same frequency or at a different frequency.

24 Claims, 11 Drawing Sheets

OTHER PUBLICATIONS

Nokia Connecting People, White Paper, IP Datacasting—Bringing TV to the Mobile Phone, Jan., 2004, use date Mar. 19, 2004.
K. Ahmavaara, P. Jolma and Y. Raivio, *Broadcast and Multicate Services in Mobile Networks*, Nokia Networks, use date Mar. 19, 2004.
Nokia Connecting People, Press Releases, Finnish Companies Join Forces for a Commercial Pilot for Mobile Broadcasting Services, http://press.nokia.com/PR/200312/928228_5.html; Dec. 15, 2003, use date Mar. 19, 2004.
IPDC Forum, IPDATACAST Forum, http://ipdc-forum.org, Mar. 19, 2004.
Nokia Connecting People, White Paper, IP Datacasting Technology—Bringing TV to the Mobile Phone 2003, pp. 1-7, use date Mar. 19, 2004.
ETSI EN 300 468 V1.5.1: "Digital Video Broadcasting (DVB); Specification for Service Information (SI) in DVB Systems," May 2003, see chapters 52.1, 6.2.6,6.2.7 and 6.2.16.
ETSI EN 300 744 V1.4.1: "Broadcast Video Broadcasting (DVB); Framing Structure, Channel Coding and Modulation for Digital Terrestrial Television," Jan. 2001, see chapters 4.6-4.6.3.
International Search Report for PCT/IB2005/000729—Dated Sep. 6. 2005 International Filing Date—Mar. 21, 2005.

* cited by examiner 100
103
107
Configuration Manager
123
125
121
119
127
113a
113c
113
113b
115
111
117
109
105
Service Server
101

| Syntax | No. of bits | Identifier |
|---|---|---|
| network_information_section(){ | | |
| table_id | 8 | uimsbf |
| section_syntax_indicator | 1 | bslbf |
| reserved_future_use | 1 | bslbf |
| reserved | 2 | bslbf |
| section_length | 12 | uimsbf |
| network_id | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved_future_use | 4 | bslbf |
| network_descriptors_length | 12 | uimsbf |
| for(i=0;i<N;i++){ | | |
| descriptor() | | |
| } | | |
| reserved_future_use | 4 | bslbf |
| transport_stream_loop_length | 12 | uimsbf |
| for(i=0;i<N;i++){ | | |
| transport_stream_id | 16 | uimsbf |
| original_network_id | 16 | uimsbf |
| reserved_future_use | 4 | bslbf |
| transport_descriptors_length | 12 | uimsbf |
| for(j=0;j<N;j++){ | | |
| descriptor() | | |
| } | | |
| } | | |
| CRC_32 | 32 | rpchof |
| } | | |

FIG. 4A

| Syntax | No. of bits | Identifier |
|---|---|---|
| cell_frequency_link_descriptor(){ | | |
| descriptor_tag | 8 | uimsbf |
| descriptor_length | 8 | uimsbf |
| for (i=0;i<N;i++){ | | |
| cell_id | 16 | uimsbf |
| frequency | 32 | uimsbf |
| subcell_info_loop_length | 8 | uimsbf |
| for (j=0;j<N;j++){ | | |
| cell_id_extension | 8 | uimsbf |
| transposer_frequency | 32 | uimsbf |
| ] | | |
| } | | |
| } | | |

FIG. 4B

| Syntax | No. of bits | Identifier |
|---|---|---|
| cell_list_descriptor(){ | | |
| descriptor_tag | 8 | uimsbf |
| descriptor_length | 8 | uimsbf |
| for (i=0;i<N;i++){ | | |
| cell_id | 16 | uimsbf |
| cell_latitude | 16 | uimsbf |
| cell_longitude | 16 | uimsbf |
| cell_extent_of_latitude | 12 | uimsbf |
| cell_extent_of_longitude | 12 | uimsbf |
| subcell_info_loop_length | 8 | uimsbf |
| for (j=0;j<N;j++){ | | |
| cell_id_extension | 8 | uimsbf |
| subcell_latitude | 16 | uimsbf |
| subcell_longitude | 16 | uimsbf |
| subcell_extent_of_latitude | 12 | uimsbf |
| subcell_extent_of_longitude | 12 | uimsbf |
| } | | |
| } | | |
| } | | |

FIG. 4C

| Syntax | No. of bits | Identifier |
|---|---|---|
| terrestrial_delivery_system_descriptor(){ | | |
| descriptor_tag | 8 | uimsbf |
| descriptor_length | 8 | uimsbf |
| centre_frequency | 32 | bslbf |
| bandwidth | 3 | bslbf |
| priority | 1 | bslbf |
| time_slicing_indicator | 1 | bslbf |
| MPE-FEC_indicator | 1 | bslbf |
| reserved_future_use | 2 | bslbf |
| constellation | 2 | bslbf |
| hierarchy_information | 3 | bslbf |
| code_rate-HP_stream | 3 | bslbf |
| code_rate-LP_stream | 3 | bslbf |
| guard_interval | 2 | bslbf |
| transmission_mode | 2 | bslbf |
| other_frequency_flag | 1 | bslbf |
| reserved_future_use | 32 | bslbf |
| } | | |

FIG. 4D

| Syntax | No. of bits | Identifier |
|---|---|---|
| frequency_list_descriptor(){ | | |
| descriptor_tag | 8 | uimsbf |
| descriptor_length | 8 | uimsbf |
| reserved_future_use | 6 | bslbf |
| coding_type | 2 | bslbf |
| for (i=0;I<N;i++){ | | |
| centre_frequency | 32 | uimsbf |
| } | | |
| } | | |

FIG. 4E

| Parameter | NIT (EN 300 468) | TPS bits (EN 300 744) | tps_mip (TS 101 191) | DVB-H proposal |
|---|---|---|---|---|
| cell identification | cell frequency link descriptor,<br>cell list descriptor, :<br>'cell_id' | $s_{40}$-$s_{47}$ | not used | |
| frequency | cell frequency link descriptor:<br>'frequency',<br>'cell_id_extension', (subcell identification)<br>'transposer_frequency' (subcell frequency) | | | |
| channel bandwidth | terrestrial delivery system descriptor:<br>'bandwidth' | | $P_{12}$, $P_{13}$ | 5 MHz added |
| mode | terrestrial delivery system descriptor:<br>'transmission_mode' | $s_{38}$, $s_{39}$ | $P_{10}$, $P_{11}$ | 4K mode added ('10') |
| constellation | terrestrial delivery system descriptor:<br>'constellation' | $s_{25}$, $s_{26}$ | $P_0$, $P_1$ | |
| code rate | terrestrial delivery system descriptor:<br>'code_rate-HP_stream',<br>'code_rate-LP_stream' | $s_{30}$, $s_{31}$, $s_{32}$<br>$s_{33}$, $s_{34}$, $s_{35}$ | $P_5$, $P_6$, $P_7$<br>$P_5$, $P_6$, $P_7$ | |
| guard interval | terrestrial delivery system descriptor:<br>'guard_interval' | $s_{36}$, $s_{37}$ | $P_8$, $P_9$ | |
| hierarchy | terrestrial delivery system descriptor:<br>'hierarchy_information' | $s_{27}$-$s_{29}$ | $P_2$, $P_3$, $P_4$ | $s_{27}$ (interleaver)<br>$s_{28}$, $s_{29}$ (hierarchy) |
| priority of transport stream | | | $P_{14}$<br>'0' Low priority TS<br>'1' High priority TS | |
| use of time slicing | | | | $s_{48}$ (time slicing use) |
| use of MPE-FEC | | | | $s_{49}$ (MPE-FEC use) |

FIG. 5

USE OF SIGNALING FOR AUTO-CONFIGURATION OF MODULATORS AND REPEATERS

FIELD OF THE INVENTION

This invention relates to configuring modulators and repeaters in a digital broadcast system. In particular, the invention provides apparatuses and methods for synchronizing modulation parameters used by modulators for digital services.

BACKGROUND OF THE INVENTION

Video streaming, data streaming, and broadband digital broadcast programming are increasing in popularity in wireless network applications, e.g., Internet protocol (IP) multicast services. To support these wireless applications, wireless broadcast systems transmit data content that support data services to many wireless terminals simultaneously. A wireless broadcast system typically comprises a plurality of cells, in which data content is distributed by a service source through a backbone network. Wireless broadcast systems are typically unidirectional networks, in which there may not be an uplink channel (i.e. wireless terminal to serving cell) available.

A Digital Video Broadcast (DVB) system is one example of a wireless broadcast system. A DVB system may support different video services including MPEG-2 multi-media services. A DVB system typically includes multiple cell transmitters (up to hundreds) that provide RF coverage for each cell. Moreover, in order to provide supplementary coverage in a cell, repeaters may be deployed to fill-in RF coverage holes. Each transmitter and repeater typically utilizes a modulator in order to modulate a transmitted radio signal with data content and service information.

Often, the transmitter configuration of a DVB system is changed in response to the dynamic nature of the environment. For example, different digital services that are broadcast at different times may require different data rates, thus requiring modulators to be reconfigured. Also, RF propagation conditions may vary with time, thus necessitating a reconfiguration of the cell transmitters. In a DVB system, the cell transmitters and repeaters are often configured from a central location such a network element manager. However, when a DVB system has many cell transmitters and repeaters that require reconfiguration, synchronizing the configuration of the modulators with the configuration of PSI/SI (program specific information/service information) generators in real time is difficult, particularly since PSI/SI generators are, in general, separate entities from the network element manager. Other reasons for reconfiguration include adding cells in order to create a denser network for better coverage, which may lead to frequency re-assignment. The need for improvement of quality of service may necessitate changes in modulation parameters.

What are needed are systems and methods that facilitate the reconfiguration of constituent modulators in a wireless broadcast system such as a DVB system and preserving the synchronization with PSI/SI at all times.

BRIEF SUMMARY OF THE INVENTION

An aspect of the present invention provides methods and apparatuses for configuring a modulator in a digital broadcast system from service information that is also broadcast to wireless terminals. In an embodiment of the invention, the service information is provided by a generator that encapsulates the service information in a transport stream that is received by a cell transmitter. The cell transmitter also utilizes the service information for generating transmission parameter signaling to the wireless terminals. In a variation of the embodiment, the digital broadcast system is implemented as a Digital Video Broadcast (DVB) system that supports wireless handheld terminals. The service information is included in a network information table that is generated by a PSI/SI generator. The network information table is parsed by each cell transmitter to determine the current modulator parameters. If at least one of the modulation parameters has changed, the associated modulator is reconfigured with the updated modulation parameters.

Another aspect of the invention provides methods and apparatuses for supporting repeaters in the digital broadcast system in order to provide supplementary RF coverage in associated cells. A repeater may retransmit a received radio signal at the same frequency or at a different frequency. With one embodiment, a repeater parses a network information table that is contained in the received radio signal and determines if at least one modulation parameter has changed. If so, the associated modulator is reconfigured. With another embodiment, the repeater decodes transmission parameter signaling that is included in the received signal and determines whether to reconfigure the associated modulator from the received transmission parameters.

Another aspect of the invention supports the updating of the modulation parameters from an IP encapsulation manager rather than requiring a separate network element manager to synchronously reconfigure the modulators of a digital broadcast system.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 4A shows a format of a Network Information Table (NIT) in accordance with an embodiment of the invention;

FIG. 4B shows a format of a cell frequency link descriptor in accordance with an embodiment of the invention;

FIG. 4C shows a format of a cell list descriptor in accordance with an embodiment of the invention;

FIG. 4D shows a format of a terrestrial delivery system descriptor in accordance with an embodiment of the invention;

FIG. 4E shows a format of a frequency list descriptor in accordance with an embodiment of the invention;

FIG. 5 shows bit assignments for transmission parameter signaling in a digital video broadcast system in relation to the network information table and in accordance with an embodiment of the invention;

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
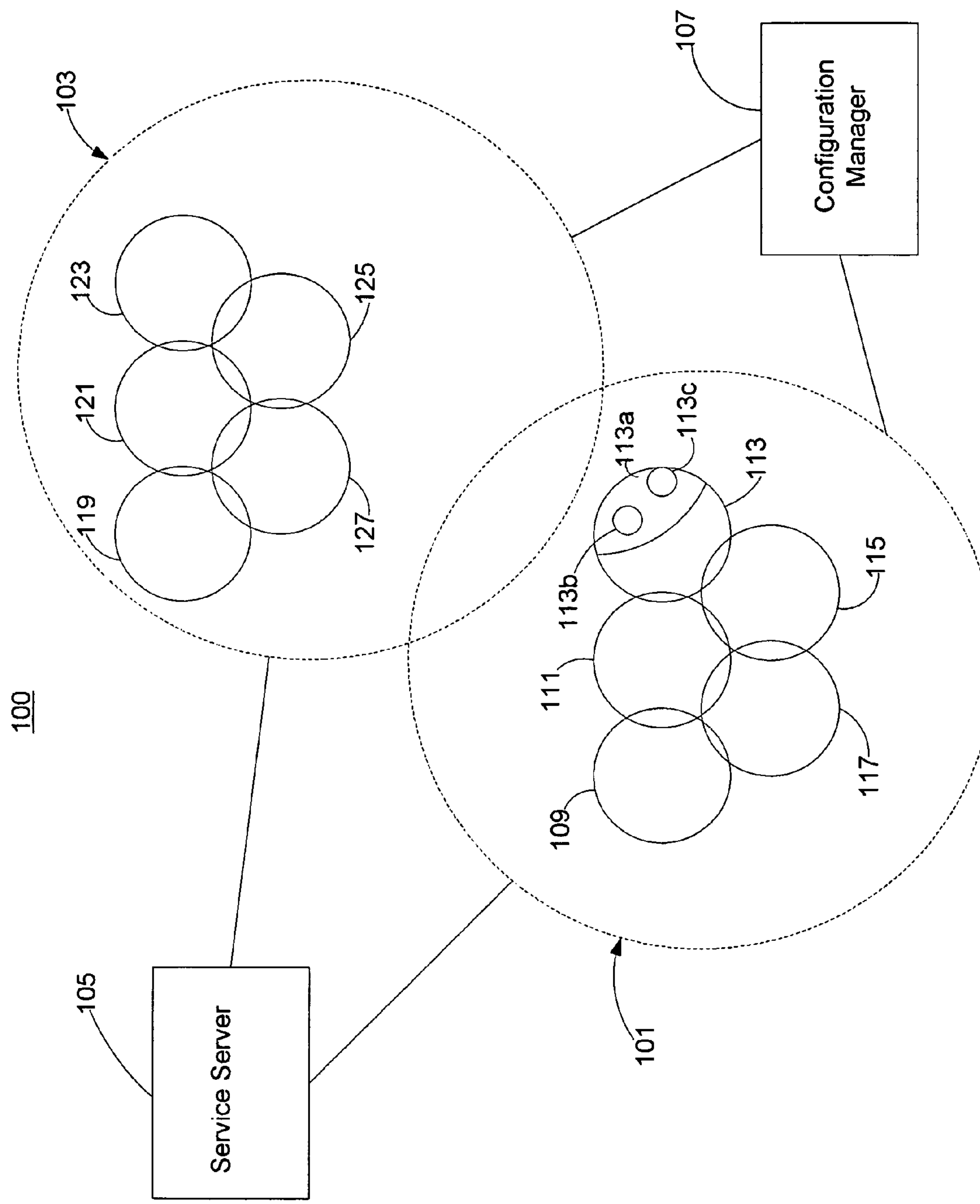
FIG. 1 shows an architecture of a Digital Video Broadcast (DVB-H) system in accordance with an embodiment of the invention.

FIG. 1 shows an architecture of a Digital Video Broadcast (DVB-H) system 100 in accordance with an embodiment of the invention. DVB-H service provides mobile media services to wireless terminals, e.g., handheld wireless units, in network 101 and network 103. In the embodiment, DVB-H system 100 is compatible with DVB-T (digital video broadcast for terrestrial operation) and supports enhancements to better support operation of wireless handheld terminals.

DVB-H system 100 supports Internet Protocol (IP) based data services in which the information may be transmitted as IP datagrams. DVB-H system 100 incorporates enhancements (with respect to a DVB-T system) that facilitates access to IP based DVB services on wireless handheld wireless terminals. (Alternative embodiments of the invention support variations of digital video broadcast systems including DVB-T, ATSC, and ISDB-T.) The DVB-H enhancements are based on the physical layer of the DVB-T physical layer with a number of service layer enhancements aimed at improving battery life and reception in the handheld environment. Thus, the DVB-H enhancements compliment existing digital terrestrial services, offering service providers the possibility to extend the market to the wireless handheld market.

Service server 105 is a source of IP services for both network 101 and network 103, although other embodiments may utilize a plurality of service servers, in which different service servers may be associated with different IP services or with different networks. DVB-H system 100 partitions each network (e.g., network 101 and network 103) into a plurality of cells, where radio transmission in each cell is supported by at least one transmitter. In the example shown in FIG. 1, network 101 is partitioned into cells 109, 111, 113, 115, and 117, and network 103 is partitioned into cells 119, 121, 123, 125, and 127. Moreover, a cell may be further partitioned into sub-cells to better provide RF coverage for "holes" in the RF coverage of DVB-H system 100. In the example shown in FIG. 1, cell 113 is further partitioned into sub-cell 113*a*, in which repeaters 113*b* and 113*c* retransmits (repeats) radio transmission from the transmitter of cell 113. Repeaters 113*b* and 113*c* may retransmit at the same frequency as the transmitter of cell 113 or at a different frequency. A repeater transmitter transmitting at a different frequency is typically referred as a frequency shifting repeater. In the embodiment, a repeater may retransmit radio transmission from a transmitter of the associated cell or from another repeater.

DVB-H system 100 may support time slicing transmission in order to reduce power consumption for small wireless handheld terminals. With time slicing, a cell transmitter transmits IP datagrams as data bursts in small time slots to wireless handheld terminals. (The benefits of time slicing are also applicable to other types of wireless terminals.) Consequently, the front end of a wireless terminal switches on only for small time intervals when the data bursts of the selected service are being transmitted by DVB-H system 100. Within the short period of time, a high data rate is received and stored in a buffer at a wireless terminal. The buffer can either store the downloaded application or continuously play live streams where the outgoing data rate depends on the application. The achievable power saving depends on the relation of the on/off time. In an embodiment of the invention, if there are approximately ten or more bursted services in a DVB-H stream, for example, the power savings consumed by the front end may be approximately 90%.

DVB-H system 100 also comprises configuration manager 107 that enables the system operator to configure cell transmitters and repeaters as will be discussed in greater detail.

Figure 2:
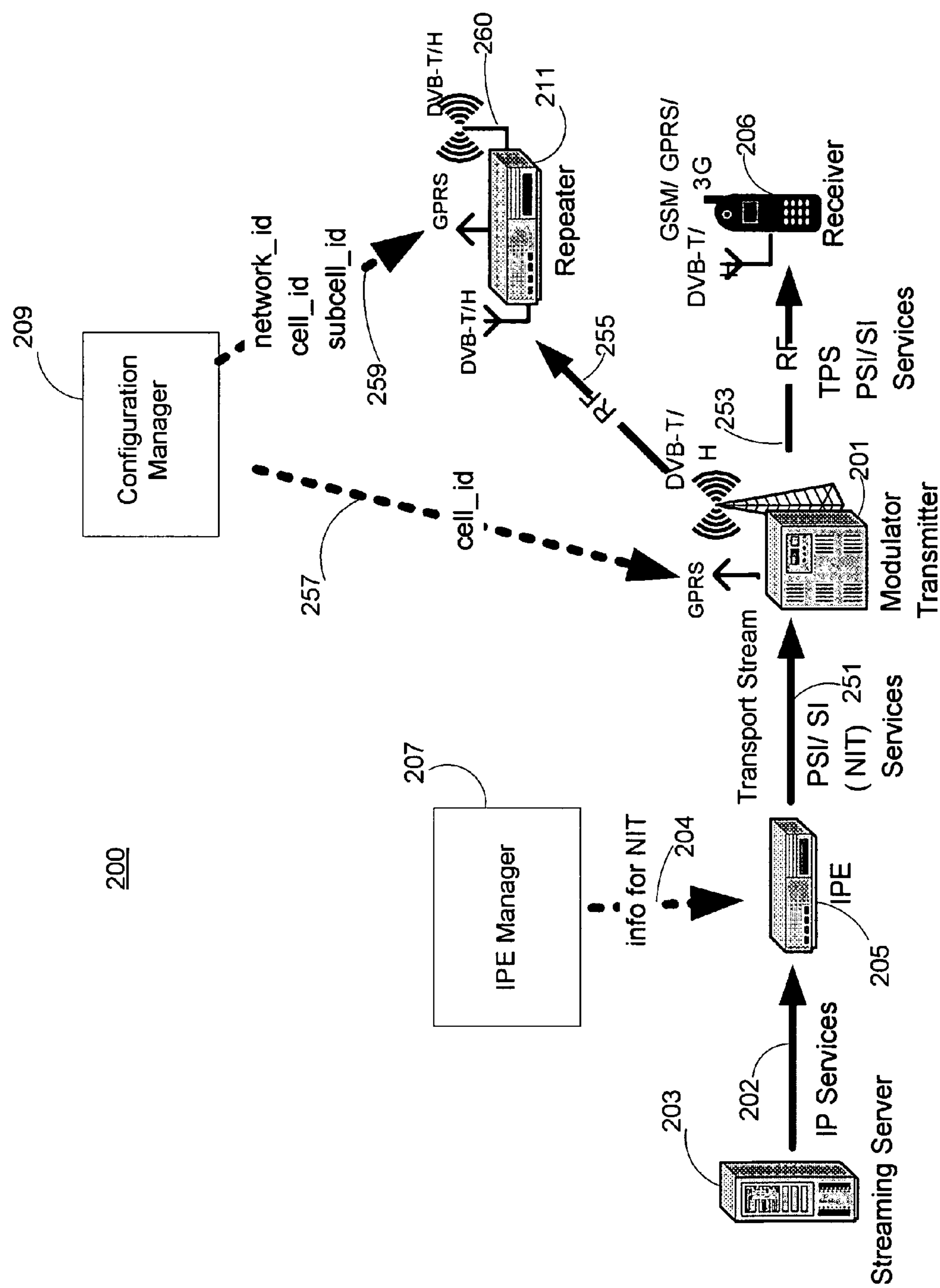
FIG. 2 shows an architecture for configuring a modulator or a repeater in a DVB-H system in accordance with an embodiment of the invention.

FIG. 2 shows an architecture for configuring a modulator/transmitter 201 in a DVB-H system 200 in accordance with an embodiment of the invention. While FIG. 2 shows only one transmitter corresponding to a cell, DVB-H system 200 typically supports hundreds of transmitters to provide RF coverage for many cells. DVB-H system 200 may support a single frequency network (SFN), where each cell is associated the same frequency, or a multiple frequency network (MFN), where frequency assignments for each cell are selected from a group of frequencies, or a combination where each cell of a MFN is in fact a SFN. In the example shown in FIG. 2, DVB-H system 200 comprises streaming server 203, IP encapulator (IPE) 205, transmitter 201, repeater 211, IP encapsulation manager 207, and configuration manager 209. While FIG. 2 only shows one transmitter and one repeater, DVB-H system 200 may typically comprise hundreds of transmitters and many repeaters. In the embodiment, a transmitter comprises a modulator and associated RF circuitry that includes an RF amplifier and frequency generation circuitry.

Streaming server 203 is a source of IP services. Corresponding packets are sent on communication path 202 through an IP network (not shown) for distribution to the plurality of transmitters through associated IP encapsulators, e.g., IPE 205. IPE 205 encapsulates service information into IP packets. In the embodiment, IPE 205 encapsulates a network information table (NIT), which is generated by IP encapsulation manager 207. While encapsulation manager 207 supports the entire DVB-H system 200, IP encapsulator 205 supports only supports transmitter 201. (Typically, in the embodiment, an IP encapsulator supports a few transmitters so that system 200 typically comprises a plurality of IP encapsulators.) IPE 205 sends transport stream 251 to transmitter 201. Transport stream 251 (e.g., a MPEG-2 transport stream) includes IP services information (data content) and program specific information/service information (PSI/SI) that comprises a network information table. Moreover, the network information table may change, resulting in changes in the configuration of transmitter 201 and repeater 211.

In the embodiment, configuration manager 209 configures each transmitter (e.g., transmitter 201) with the associated cell identification (cell_id) and each repeater (e.g., repeater 211) with the associated network identification (network_id), cell identification (cell_id), and sub-cell identification (sub-cell_id). However, the configuration provided by configuration manager 209 does not typically change (in comparison with the information contained in the network information table) or the changes that do occur require no synchronization with PSI/SI, such as changing output power. Configuration manager 209 configures transmitter 201 through communications path 257 and repeater 211 through communications path 259.

The PSI/SI information for DVB-H system 200 is generated by a centralized PSI/SI generator and contains the network information table. The network information table contains the complete list of frequencies that are used in DVB-H system 200, including the modulation parameters that are used for generating RF signals at the associated frequencies. The network information table includes the complete list of cells of DVB-H system 200, each cell being identified by the cell_id. The descriptors which contain this information are: the cell-frequency list descriptor and the cell-list-descriptor as will be discussed in the context of FIGS. 4B and 4C, respectively.

PSI/SI information has been designed for mobile and fixed receivers, to allow wireless handheld terminal 206 to discover the services contained in the signal. This information, and with it the network information table, passes through the transmitter 201 and repeater 211, and is transmitted, together with the actual IP services.

The PSI/SI information is managed in IPE Manager 207. IPE Manager 207 pushes the configuration via a proprietary, multicast-based protocol over communications path 204 to all the IPEs (e.g., IPE 205), which perform the role of PSI/SI generators in an embodiment of the invention. Whenever the PSI/SI information changes, all IPEs receive this information at approximately the same time, and activate the configuration, i.e., update the PSI/SI tables (including the NIT). The network information table is part of the transport stream (TS) 251 that is fed to one or more transmitters.

In the embodiment, as shown in FIG. 2, precise synchronization of PSI/SI information and transmission parameter signaling (TPS) bits in DVB-H signal 253, which is broadcasted to wireless handheld terminal 206 by modulator/transmitter 201, is achieved by updating the modulation parameters that are actually used by the modulator 201. DVB-H system 200 may configure large network of modulators in real-time from a central location (e.g., network element manager 207). In particular, the embodiment makes it possible to synchronize the configuration of the modulators (e.g., modulator 201) with the configuration of the PSI/SI generators (e.g., IPE 205 in conjunction with IPE manager 207). DVB-H system 200 may consist of hundreds of modulators.

The synchronization of the network information table and TPS bits can be achieved. The network information table is generated first by encapsulating the network information table into the transport stream by IP encapsulator 205. (Other embodiments of the invention may utilize a multiplexer or a PSI/SI inserter). Transmitter 201 parses transport stream 251, reads the network information table (by separating (decapsulating) the network information table from transport stream 251), and generates the TPS bits that are broadcast on radio signal 253. Thus, the network information table and the TPS bits are always synchronized without updating the associated parameters from configuration manager 209.

Each modulator (e.g., corresponding to transmitter 201) is configured with just the cell_id of its own cell. Instead of just modulating the PSI/SI information for the benefit of the receivers (e.g., wireless handheld terminal 206), transmitter 201 continuously parses the PSI/SI information from transport stream 251), filters out the network information table, and looks up which frequency, and which modulation parameters, to use for its own cell (the cell with the cell_id that has been configured by configuration manager 209). Whenever the transmitter 201 detects a change in the modulation parameters carried in the network information table, the modulator immediately starts using these parameters for the actual modulation process and also for the TPS signalling that is included into DVB-H signal 253 by modulator 201.

In an embodiment of the invention, if a cell is supported by several modulators that operate in a single-frequency network (SFN), all modulators have the same cell_id, and all the modulators are synchronized with each other.

In example shown in FIG. 2, the corresponding cell has a sub-cell with a frequency-shifting repeater 211. Repeater 211 receives radio signal 255 from transmitter 201 and re-transmits the radio signal on a different frequency. The sub-cells are identified by a subcell_id, which is an extension to the cell_id, and the cell list in the network information table contains information about which frequency and modulation parameters are used in the sub-cell. If a cell or sub-cell has additional repeaters (not shown in FIG. 2 and that receive a signal and re-transmit the signal on the same frequency (non-frequency shifting)), the mechanism of auto-configuring such repeaters is similar as for frequency-shifting repeaters. Such same-frequency repeaters have the same cell/subcell identification as the signal they repeat.

In the embodiment shown in FIG. 2, DVB-H system 200 ensures that the PSI/SI signaling and the actual modulation parameters used are synchronized at essentially all times. It also ensures that the modulation parameters can be configured from a single location (e.g., the IPE Manager 207) and are consistent with the NIT, which is a very important aspect for mobility enabling hand-over without interruption.

Figure 3:
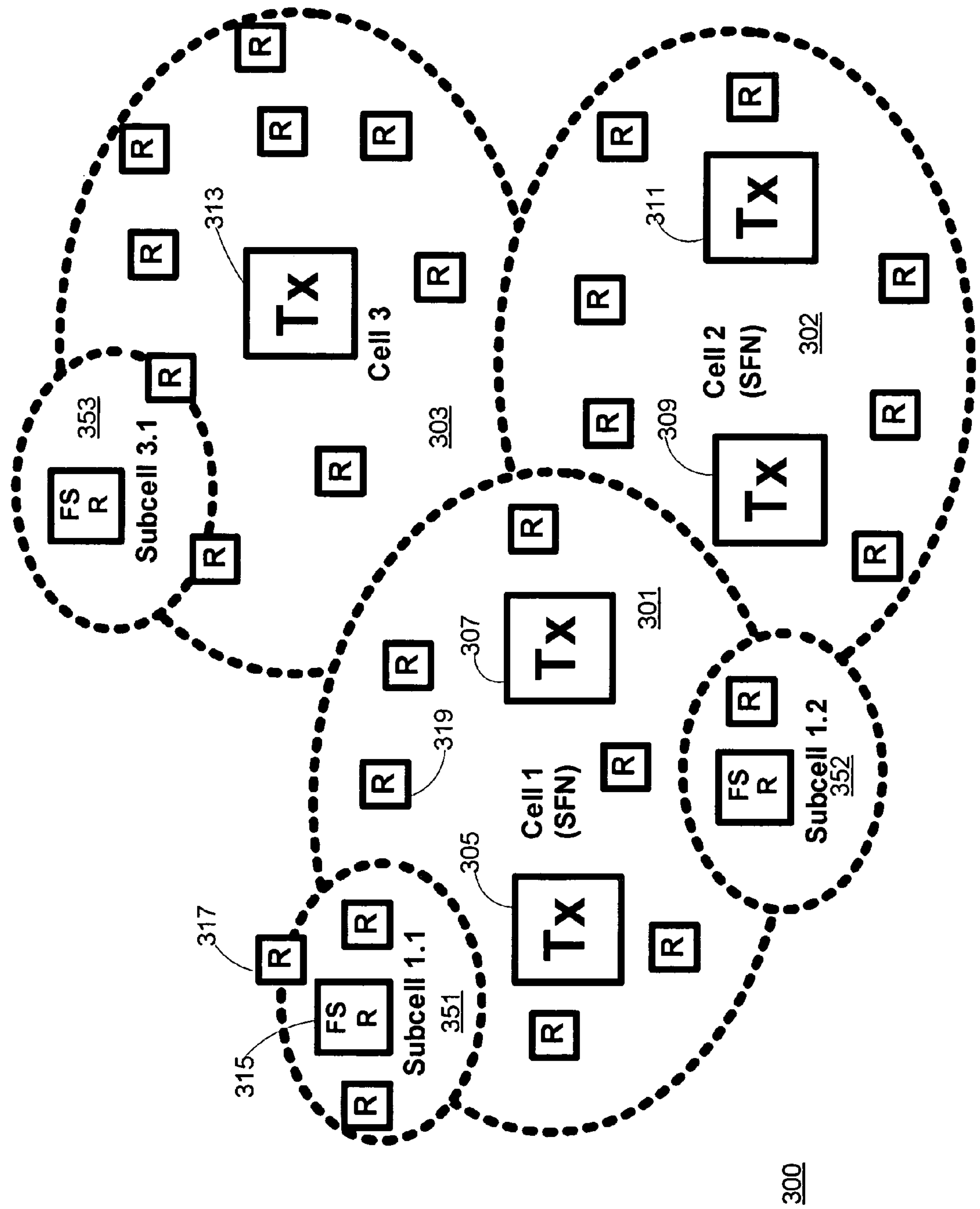
FIG. 3 shows an exemplary configuration of a DVB-H system in accordance with an embodiment of the invention.

FIG. 3 shows an exemplary configuration of a DVB-H system 300 in accordance with an embodiment of the invention. DVB-H system 300 provides service coverage in a region corresponding to cells 301-303. Transmitters 305 and 307 (which include a modulator) provide digital services to wireless terminals that are located within cell 301. Transmitters 309 and 311 provide digital services by broadcasting radio signals to wireless terminals that are located within cell 302. Transmitters 313 provide digital services to wireless terminals that are located within cell 303. (In the embodiment, each cell may be assigned with at least one transmitter in order to achieve the desired RF coverage and if there is more than one transmitter they operate in SFN mode.)

In the embodiment shown in FIG. 3, a cell may be configured with repeaters in order to provide additional RF coverage. For example the RF coverage provided by transmitters 305 and 307 may not adequately cover the entire region of cell 301. Thus, cell 301 is further configured with sub-cell 351 and sub-cell 352, and cell 303 is further configured with sub-cell 353 in order to fill-in RF coverage holes. A sub-cell is associated with a cell by assigning the cell identification and further by assigning a sub-cell identification, which is an extension of the cell identification. The repeaters that define a sub-cell are always frequency-shifting repeaters.

In the embodiment, a repeater retransmits a radio signal that is received from a cell transmitter or from another repeater. As shown in FIG. 3, repeater 315 receives a radio signal from transmitter 305 at a first frequency and retransmits the radio signal at a second frequency in accordance with configured modulation parameter. (Repeater 315 may thus be referred as a frequency shifting repeater.) Repeater 317 is associated with repeater 315. Repeater 317 receives the radio signal at the second frequency from repeater 315 and retransmits the radio signal at the second frequency. However, repeater 319 receives the radio signal from transmitter 305 at the first frequency and retransmits the radio signal at the first frequency. (In FIG. 3, "FSR" denotes a frequency shifting repeater.)

FIG. 4A shows a format of a Network Information Table (NIT) in accordance with an embodiment of the invention. The network information table is compatible with the format shown in ETSI EN 300 468 "Digital Broadcasting (DVB); Specification for Service Information (SI) in DVB systems." The network information table contains a list of cells in the network, where each cell is identified by a cell identification. The network information table may include a cell-frequency list descriptor (as shown in FIG. 4B) and a cell-list descriptor (as shown in FIG. 4C). (However, other embodiments of the invention may utilize other formats of the network information table that convey similar or substantially similar information.)

FIG. 4B shows a format of a cell frequency link descriptor in accordance with an embodiment of the invention. The cell frequency link descriptor is used in the network information table. The cell_id field is a 16-bit field that uniquely identifies a cell. The frequency field is a 32-bit field that identifies the main frequency that is used by the identified cell. The coding is according to the coding of the center frequency field in the terrestrial_delivery_system_descriptor (as shown in FIG. 4D). The subcell_info_loop_length field is a 8-bit field that gives the total length in bytes of the following loop that indicates the frequencies used in sub-cells. The cell_id_extension field is used to identify a sub-cell within a cell. The transposer_frequency field is a 32-bit field that identifies the frequency that is used by a transposer in the indicated sub-cell. (A transposer is typically used in a frequency shifting repeater, e.g., repeater 315 as shown in FIG. 3.) The coding of the frequency is according to the coding the center frequency in the terrestrial_delivery_system_descriptor.

FIG. 4C shows a format of a cell list descriptor in accordance with an embodiment of the invention. The cell list descriptor is used with the network information table and provides a list of all cells of the network. The cell list descriptor includes the cell, subcell_info_loop_length, and cell_id_extension fields, as previously discussed. Also, the cell list descriptor includes the latitude and longitude of the cell and sub-cell in associated fields.

FIG. 4D shows a format of a terrestrial delivery system descriptor in accordance with an embodiment of the invention. The terrestrial delivery system descriptor is used in the network information table. The terrestrial delivery system includes parameters that may be used to configure a modulator of a cell transmitter or a repeater. For example, the terrestrial delivery system descriptor includes a bandwidth field, a constellation field that specifies the constellation characteristics, a hierarchy_information field that indicates whether the transmission is hierarchical, a code_rate field that specifies the inner FEC (forward error correction) scheme, a guard_interval field, and a transmission_mode field that specifies the number of carriers in an OFDM field.

FIG. 4E shows a format of a frequency list descriptor in accordance with an embodiment of the invention. The frequency list descriptor is used in the network information table and provides a list of additional frequencies for a certain multiplex which is transmitted on multiple frequencies.

FIG. 5 shows bit assignments for transmission parameter signaling in a digital video broadcast system in relation to the network information table and in accordance with an embodiment of the invention. ETSI EN 300 468 "Digital Broadcasting (DVB); Specification for Service Information (SI) in DVB systems specifies a format for the network information table. ETSI EN 300 744 v1.4.1 "Broadcast Video Broadcasting (DVB); Framing structure, channel coding and modulation for digital terrestrial television" and ETSI TS 101 191 v1.3.1 "Digital Video Broadcasting (DVB); DVB megaframe for Single Frequency Network (SFN) synchronization" specify a format for the TPS bit assignments for the transmission parameter signal. (However, the embodiment may support other formats for signalling and for service information.) Also, the embodiment may support other TPS assignments, e.g., shown in the last column ("DVB-H proposal"), in order to provide enhancements for wireless handheld terminals.

In the embodiment, as shown in FIG. 5, TPS signaling bits may be determined from the network information table. For example, in an embodiment, the TPS bits include a cell identification field, a transmission mode field, a constellation field, a code rate field, a guard interval field, a hierarchy field. In another embodiment, the TPS bits can be enhanced to include a timeslicing flag and a MPE_FEC flag.

Figure 6:
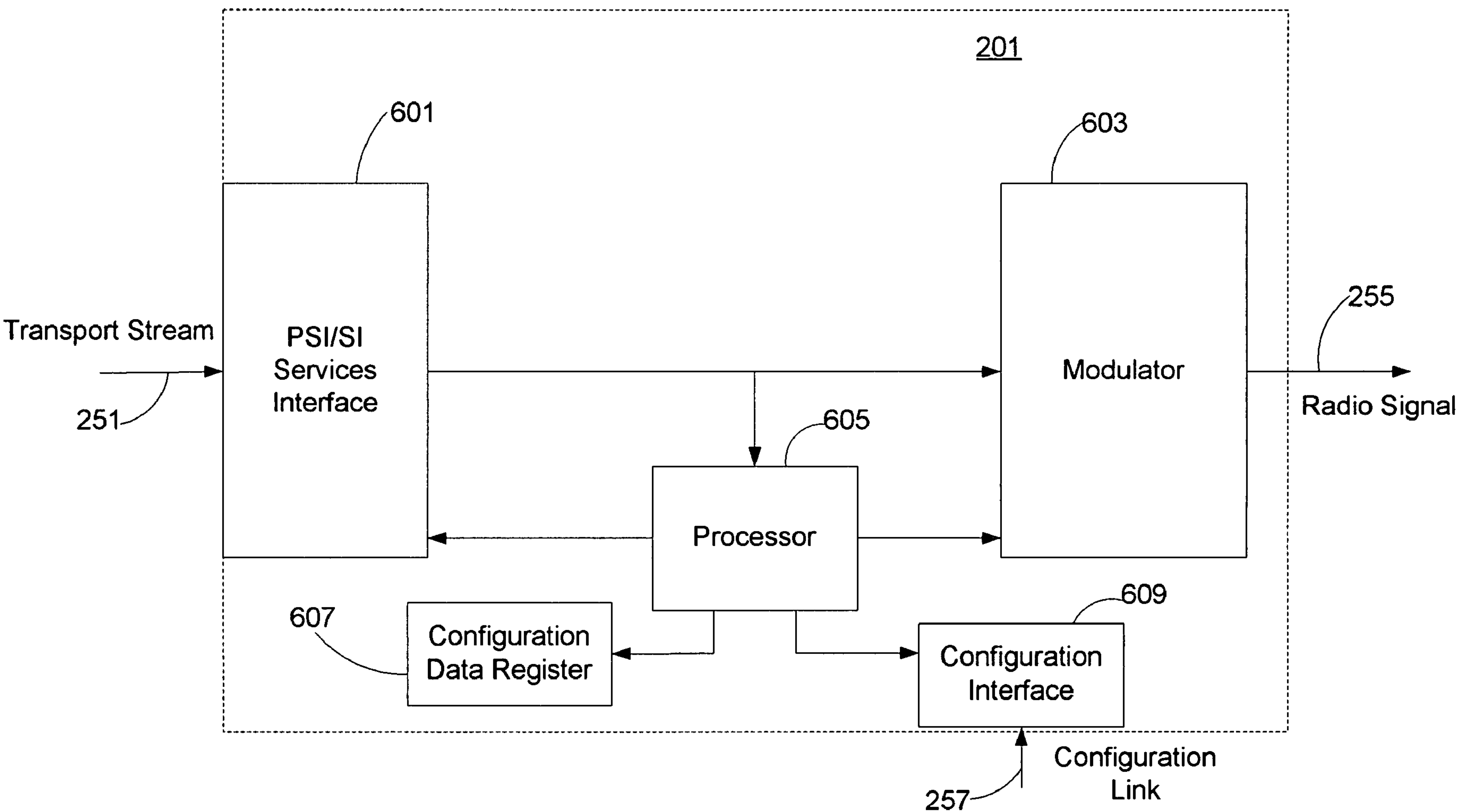
FIG. 6 shows a cell transmitter that supports the configuration of a modulator in accordance with an embodiment of the invention.

FIG. 6 shows cell transmitter 201 that supports the configuration of a modulator 603 in accordance with an embodiment of the invention. Transmitter 201 comprises PSI/SI services interface 601, modulator 603, processor 605, configuration data register 607, and configuration interface 609. Interface 601 receives transport stream 251, which contains data content and service information such as the network information table. Modulator 603 modulates radio signal 255 with the information obtained from transport stream 251. (Although not shown in FIG. 6, transmitter 201 typically comprises circuitry that frequency translates the output of modulator 603 and amplifies the RF signal.)

Processor 605 parses the network information table as provided by the output of interface 601 and compares the received cell identification (as contained in the network information table) with the configured cell identification that is stored in configuration data register 607.

Configuration manager 209 (as shown in FIG. 2) provides the configured cell identification through communications path 257 to configuration interface 609. Processor 605 retrieves the configured cell identification from interface 609 and stores the configured cell identification in configuration data register 607.

If the received cell identification is the same as the configured cell identification, processor 605 parses the configuration information (as contained in the network information table) and determines whether any of the modulation parameters have changed from the previously received network information table. In the embodiment, modulation parameters include the channel bandwidth, transmission mode, code rate, constellation pattern, and guard interval. Other modulation parameters, e.g., a time slicing indicator and a MPE-FEC indicator may be supported. Additionally, processor 605 extracts the assigned frequency that is associated with the cell identification and retunes the transmitter if the assigned frequency has changed.

In the embodiment, transmitter 201 needs to be configured only with the cell identification (cell_id) (apart from specific, non-transmission-related settings such as IP addresses, user names and passwords). Transmitter 201 can learn its configuration (frequency, modulation parameters, TPS information) from the network information table, in real-time. Whenever transmitter 201 detects a change in the parameters of its own cell, transmitter 201 can instantly start using the new parameters, by changing the modulation parameters (and announcing them in the TPS bits) and possibly start transmitting on a new frequency.

Figure 7:
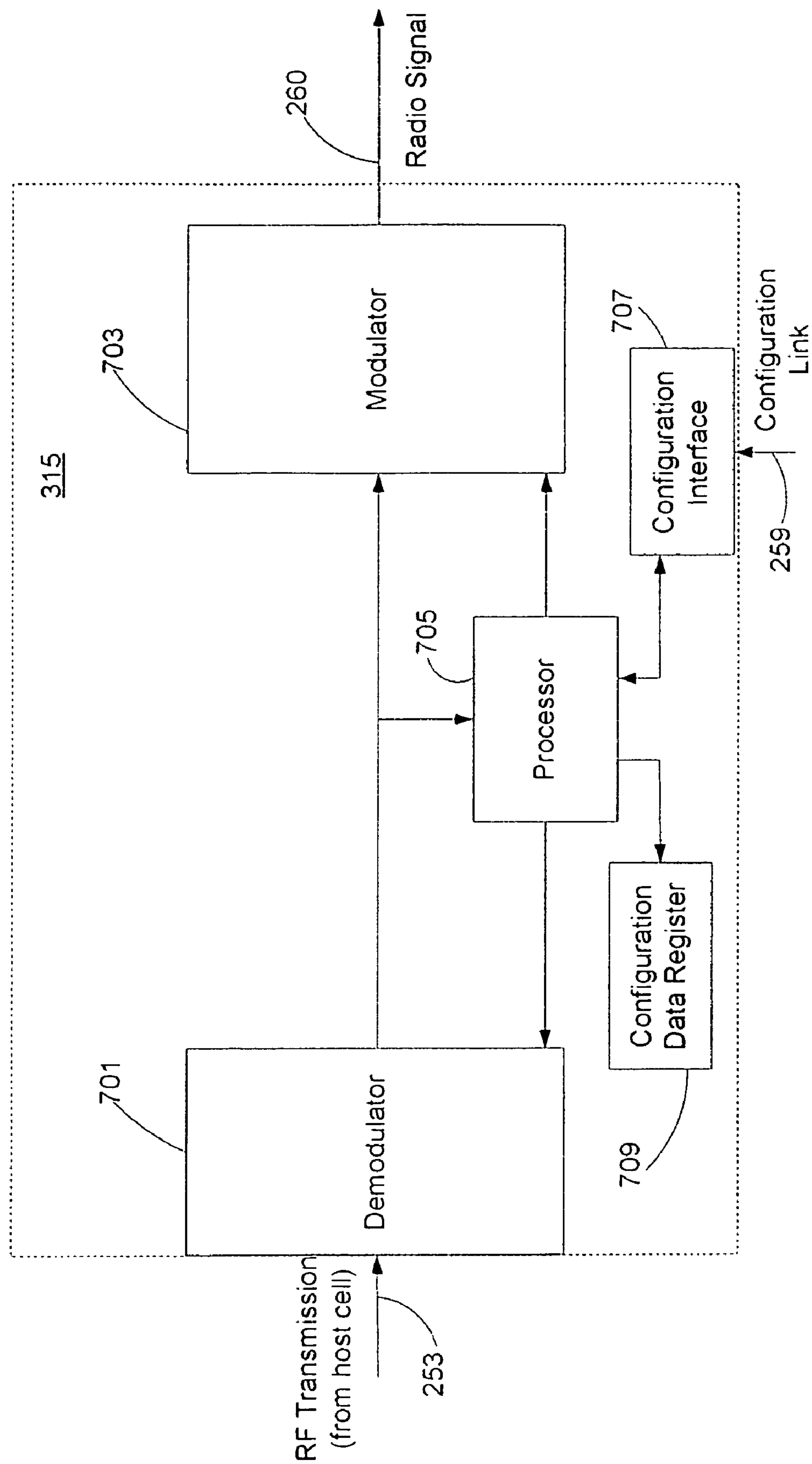
FIG. 7 shows a frequency shifting repeater that supports the configuration of a modulator in accordance with an embodiment of the invention.

FIG. 7 shows frequency shifting repeater 315 that supports the configuration of modulator 703 in accordance with an embodiment of the invention. Repeater 315 comprises demodulator 701, modulator 703, processor 705, configuration interface 707, and configuration data register 709. Repeater 315 receives radio signal 253 from cell transmitter 305, demodulates radio signal 253 as performed by demodulator 701, and retransmits radio signal 260 through modulator 703. Because repeater 315 is a frequency shifting repeater, the frequency of radio signal 253 is different from the frequency of radio signal 260.

Modulator 703 modulates radio signal 260 in accordance with data content and the network information table contained in radio signal 253. Also, processor 705 parses the received network information table to determine if any modulation parameters have changed. If so, processor 705 reconfigures modulator 703 with the changed modulator parameters.

Frequency-shifting repeater 315 typically includes demodulator 701. Thus, repeater 315 has access to the network information table and may use a similar mechanism as modulator 603 as shown in FIG. 6. Repeater 315 needs to be configured with only the network_id, cell_id and subcell_id. The configuration (and configuration changes) are relevant for receiving the incoming signal (especially, for finding the incoming radio signal again in case the modulator changes the frequency) and for producing the outgoing radio signal. In case the incoming radio signal changes its modulation parameters, repeater 315 can automatically adapt to the new parameters by trying out different parameters. In case the incoming signal 253 changes its frequency, repeater 315 can perform a full signal scan (with all possible modulation parameters), until repeater 315 finds the signal that matches its network_id and cell_id. As soon as the radio signal is found (there can be only one), repeater 315 can look up the frequency and modulation parameters from the NIT and start re-transmitting. Once repeater 315 is able to receive the correct incoming radio signal 253, repeater 315 can receive and decode the NIT, learn the desired outgoing frequency and modulation parameters, and instantly use the parameters. Whenever repeater 315 detects a change in the parameters of its own sub-cell, repeater 315 can instantly start using the new parameters (and announcing them in the TPS bits) and possibly start transmitting on a new frequency.

In a variation of the embodiment of the invention, repeater 315 (corresponding to repeater 211 as shown in FIG. 2) processes a "next" network information table (NIT) if a "next" NIT is announced in incoming signal 253, e.g., by using the current_next_indicator as shown in FIG. 4A or by another similar signal. The "next" NIT contains updated configuration information, e.g., an updated frequency that repeater 315 receives for retransmission. Repeater 315 stores the updated configuration information and subsequently configures itself in accordance with the updated configuration information. When reconfiguring, repeater 315, for example, tunes to the updated frequency. (The updated frequency may be the same as the previously configured frequency or may be different than the previously configured frequency.) Consequently, if transmitter 305 were reconfigured to change its transmitting frequency with the updated frequency (corresponding to incoming signal 253), repeater 315 retunes to the updated frequency. If, however, repeater 315 is unable to find incoming radio signal 253 after retuning to the updated frequency, repeater 315 may perform a signal scan over the assigned frequency spectrum in order to find the correct frequency of incoming signal 253. In addition, if repeater 315 does not receive a "next" NIT, repeater 315 may perform a signal scan. The variation of the embodiment also supports non-frequency shifting repeaters (e.g., repeater 317).

In the embodiment, a non-frequency shifting repeater (e.g., repeater 317 as shown in FIG. 3) needs to be configured with only the network_id, cell_id and the subcell_id (the subcell_id is only present when the repeater is repeating the signal of a sub-cell). In the embodiment, a non-frequency shifting repeater may receive a radio signal from a cell transmitter (e.g., transmitter 305) or from a frequency shifting repeater (e.g., repeater 315). A non-frequency shifting repeater does not typically have a demodulator, but it is able to decode at least the TPS bits. In this case, the non-frequency shifting repeater may perform a signal scan until the repeater finds a signal with a matching network_id, cell_id and subcell_id (there can be only one, except if not all three parameters are contained in the TPS bits). If a unique match is found, the non-frequency shifting repeater can repeat the signal with the modulation parameters described in the TPS bits. If the non-frequency shifting repeater cannot decode the TPS bits, or if no match or multiple matches are found, the repeater sends an alarm and goes out of operation until the repeater is manually configured over remote connection 257 (e.g., a GPRS communications path) from configuration manager 209.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method comprising:

(A) receiving a radio signal at a first frequency, the radio signal supporting a digital service;

(B) demodulating the radio signal to obtain a demodulated radio signal;

(C) extracting configuration information with a processor from the demodulated radio signal;

(D) applying, with the processor, modulation parameters to a modulator, the modulation parameters being contained in the configuration information;

(E) retransmitting data from the radio signal at a second frequency, the configuration information being indicative of the second frequency, the first frequency being different from the second frequency;

(F) scanning a radio spectrum; and (G) determining the first frequency from the radio signal, further comprising:

(i) matching a configured network identification and a configured cell identification with a received network identification and a received cell identification, wherein the received network identification and the received cell identification are extracted from the configuration information.

2. The method of claim 1, further comprising:

generating transmission parameter signaling with transmission parameters contained in the configuration information.

3. The method of claim 1, wherein the configuration information is contained in a network information table.

4. The method of claim 1, wherein (D) comprises:

(i) detecting whether at least one of the modulation parameters changes value; and (ii) in response to an outcome of (i), applying the modulation parameters to the modulator.

5. The method of claim 1, further comprising:

(H) configuring a sub-cell with a configured network identification, a configured cell identification, and a configured sub-cell identification, wherein the matching further comprises:

(i) matching the configured sub-cell identification with a received sub-cell identification, the received sub-cell identification being extracted from the configuration information.

6. The method of claim 1, further comprising:

(H) receiving a next network information table that is conveyed in the radio signal;

(I) extracting updated configuration information from the next network information table; and (J) retuning to an updated frequency, the updated frequency being contained in the updated configuration information.

7. The method of claim 6, further comprising:

if unable to subsequently receive the radio signal at the updated frequency, scanning an assigned frequency spectrum to find the radio signal.

8. The method of claim 1, further comprising:

if unable to receive a next network information table, scanning an assigned frequency spectrum to find the radio signal.

9. A method comprising:

(A) receiving a radio signal at a selected frequency, the radio signal supporting a digital service;

(B) decoding transmission parameter signaling, the transmission parameter signaling being conveyed in the radio signal;

(C) extracting, with a processor, a received network identification and a received cell identification from the transmission parameter signaling;

(D) if the received network identification and a received cell identification match a configured network identification and a configured cell identification, respectively, extracting with the processor modulation parameters from the transmission parameter signaling;

(E) retransmitting the radio signal at the selected frequency by utilizing the modulation parameters;

(F) receiving a next network information table that is conveyed in the radio signal;

(G) extracting updated configuration information with the processor from the next network information table; and (H) retuning to an updated frequency, the updated frequency being contained in the updated configuration information.

10. The method of claim 9, further comprising:

(I) in response to (H), if unable to subsequently receive the radio signal at the updated frequency, scanning an assigned frequency spectrum to find the radio signal.

11. A method comprising:

(A) receiving a radio signal at a selected frequency, the radio signal supporting a digital service;

(B) decoding transmission parameter signaling, the transmission parameter signaling being conveyed in the radio signal;

(C) extracting, with a processor, a received network identification and a received cell identification from the transmission parameter signaling;

(D) if the received network identification and a received cell identification match a configured network identification and a configured cell identification, respectively, extracting with the processor modulation parameters from the transmission parameter signaling;

(E) retransmitting the radio signal at the selected frequency by utilizing the modulation parameters;

(F) if unable to receive a next network information table, scanning an assigned frequency spectrum to find the radio signal.

12. An apparatus, comprising:

a modulator;

a demodulator; and a processor, configured to:

receive a radio signal at a first frequency, the radio signal supporting a digital service;

demodulate the radio signal using the demodulator to obtain a demodulated radio signal;

extract configuration information from the demodulated radio signal;

apply modulation parameters to the modulator, the modulation parameters being contained in the configuration information;

retransmit the radio signal at a second frequency, the configuration information being indicative of the second frequency, the first frequency being different from the second frequency;

scan a radio spectrum; and determine the first frequency from the radio signal, by:

matching a configured network identification and a configured cell identification with a received network identification and a received cell identification, wherein the received network identification and the received cell identification are extracted from the configuration information.

13. The apparatus of claim 12, wherein the processor is further configured to generate transmission parameter signaling with transmission parameters contained in the configuration information.

14. The apparatus of claim 12, wherein the configuration information is contained in a network information table.

15. The apparatus of claim 12, wherein the processor is further configured to:

detect whether at least one of the modulation parameters changes value; and in response to detecting a change in at least one of the modulation parameters, applying the changed modulation parameters to the modulator.

16. The apparatus of claim 12, wherein said processor is further configured to:

extract a received sub-cell identification from the configuration information; and match a configured sub-cell identification with a received sub-cell identification.

17. The apparatus of claim 12, wherein said processor is further configured to:

receive a next network information table from the radio signal; and extract the first frequency from the next network information table.

18. The apparatus of claim 12, wherein said processor is further configured to send an alarm if the configured network identification or the configured cell identification does not match any corresponding information in the transmission parameter signaling.

19. A computer-readable medium, storing computer-executable instructions for performing the following:

receive a radio signal at a first frequency, the radio signal supporting a digital service;

demodulate the radio signal to obtain a demodulated radio signal;

extract configuration information from the demodulated radio signal;

apply modulation parameters to the modulator, the modulation parameters being contained in the configuration information;

retransmit data from the radio signal at a second frequency, the configuration information being indicative of the second frequency, the first frequency being different from the second frequency;

scan a radio spectrum; and determine the first frequency from the radio signal, by:

matching a configured network identification and a configured cell identification with a received network identification and a received cell identification, wherein the received network identification and the received cell identification are extracted from the configuration information.

20. The computer-readable medium of claim 19, further storing computer-executable instructions that cause a processor to perform the following:

generate transmission parameter signaling with transmission parameters contained in the configuration information.

21. The computer-readable medium of claim 19, further storing computer-executable instructions that cause a processor to perform the following:

detect whether at least one of the modulation parameters changes value; and in response to detecting a change in at least one of the modulation parameters, applying the changed modulation parameters to the modulator.

22. The computer-readable medium of claim 19, further storing computer-executable instructions that cause a processor to perform the following:

extract a received sub-cell identification from the configuration information; and match a configured sub-cell identification with a received sub-cell identification.

23. The computer-readable medium of claim 19, further storing computer-executable instructions that cause a processor to perform the following:

receive a next network information table from the radio signal; and extract the first frequency from the next network information table.

24. The computer-readable medium of claim 19, further storing computer-executable instructions that cause a processor to send an alarm if the configured network identification or the configured cell identification does not match any corresponding information in the transmission parameter signaling.

* * * * *